UNITED STATES PATENT OFFICE.

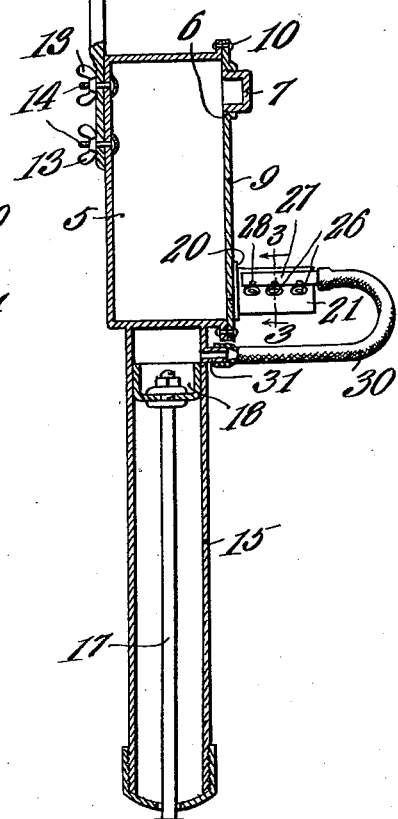

JOHN FRANKLIN PATTERSON, OF WARREN, OHIO, ASSIGNOR OF ONE-EIGHTH TO DANIEL JOSEPH O'ROURKE, OF WARREN, OHIO.

SPRAYER.

1,013,307.     Specification of Letters Patent.     Patented Jan. 2, 1912.

Application filed March 6, 1911. Serial No. 612,606.

*To all whom it may concern:*

Be it known that I, JOHN F. PATTERSON, a citizen of the United States, residing at Warren, in the county of Trumbull and State of Ohio, have invented a new and useful Sprayer, of which the following is a specification.

This invention relates to liquid distribution, and more especially to that class of devices therein known as sprayers; and the purpose of the same is to provide a machine for spraying insecticide upon rows of plants by the atomizer principle. This object is accomplished by the construction of sprayer hereinafter more fully described and claimed, and as shown in the drawings wherein—

Figure 1 is a front elevation of this machine complete, and Fig. 2 is a vertical section thereof. Fig. 3 is a cross section on the line 3—3 of Fig. 2 on an enlarged scale and Fig. 4 is an enlarged longitudinal section on the line 4—4 of Fig. 3.

In the drawings the numeral 5 designates a font or reservoir having through one wall near its top an inlet or filling opening 6 closed by a cap 7 and also having at a low point an outlet opening 8. These openings may be formed in a plate 9 detachably secured at 10 to the body of the font which latter may have the contour best seen in Fig. 1 or any other shape adapted to the wants of the user.

The numeral 11 designates a handle mounted on a shaft 12 whose lower end is detachably connected by thumb nuts 13 with bolts 14 whose heads are seated in the font in such way as to avoid leakage of the liquid therein. The numeral 15 designates the cylinder of an air pump preferably secured rigidly at its upper end to the bottom of said font, 16 is a stirrup of a size to receive the foot of an operator, 17 is the rod rising from this stirrup and extending throughout the length of the cylinder 15, and 18 is the air valve at the upper end of this rod. By this construction it will be seen that when the operator places his foot within the stirrup 16 and draws upward on the handle 11 he causes the cylinder to ascend on the valve so as to take in air, and when he pushes the handle downward he causes the cylinder to descend on the valve so as to trap the air already taken in; and the manner in which I use this air for spraying on the atomizer principle will now be described.

The numeral 20 designates a collar fixed to the wall of the font around its outlet opening 8, and 21 is the tubular body of a sprayer nozzle whose open inner end surrounds this collar with packing 22 between them to make a liquid tight joint. Through the wall of the font 5 extends a bolt 23 which passes axially through said collar and throughout the length of the nozzle 21, and in the closed outer end of the latter is a central hole through which this bolt passes so that its tip may receive a wing nut 24. By this construction the nozzle 21 is mounted revolubly upon the collar 20, and the outlet opening 8 communicates with the interior of the nozzle. The latter has disposed within it a series of jet tubes 25 extending at right angles to its axis and with their outer ends 26 projected through its wall as best seen in Fig. 3, the inner ends of course communicating with the interior of the nozzle. Secured along and upon the wall of this nozzle and extending at right angles to the length of said tubes is an air tube 27 whose wall is pierced with a series of fine perforations 28 disposed opposite the outer ends of said jet tubes 25 and in such direction that said perforations will direct the air across the axis of the jet tubes and atomize the liquid that may be contained within the latter. The outer end of the air tube 27 is closed as at 29, and upon its inner end is slipped a rubber hose 30 which is bent around and communicates with the interior of the air cylinder 15 of the pump, as by means of a nipple 31 projecting from the latter as seen in Fig. 2.

I have described but one of the nozzles 21 and its connection with the interior of the air pump, but it will be seen from Fig. 1 that I preferably employ two such nozzles and of like construction, and of course I provide two outlet openings 8 through which to feed the nozzles with liquid. By turning these nozzles on their axes they may be caused to deliver liquid at different and more or less divergent angles, so that the operator can walk between a row of plants and sprinkle both rows with whatever liquid his font contains.

It is obvious that the device can be used as a sprinkler by putting water into the font, or as an insecticide distributer by putting liquid poison into the tank.

Hitherto much difficulty has been experienced with insecticide distributers because of the fact that when their fonts or tanks were nearly full the delivery was too copious and the plants were injured by the poison, but on the other hand when their tanks were nearly empty the delivery was too restricted and the plants did not receive enough of the poison. By my improved construction above described, the liquid within the body of the font 5 flows out the opening 8 into each nozzle 21 until it traps the air within the latter and no more liquid can pass out, and this trapping is permitted by the oblique disposition of the jet tubes 25 as seen in Fig. 3. When the pump is actuated, its air forced through each of the tubes or sections of hose 30 is directed in fine streams through the perforations 28 across the outer ends 26 of said jet tubes 25 and atomizes the liquid in the latter and directs it in the shape of spray onto the plants being treated the angles at which the jets of spray are directed being regulated by the axial setting of the nozzles 21 as has been explained. When the operator draws upward on the handle 11 the air admitted through the fine perforations 28 is not sufficient to fill the cylinder 15, and hence fresh air passes upward past its valve 18 ready for a renewed operation. Meanwhile more liquid flows from the font 5 through the openings 8 into the nozzles 21 to replace what has been blown out of the latter, in a manner which will be clear.

It will be obvious that the general construction of this device is such that it can be carried by hand with ease, even when filled to its limit, and the operator is not required to carry anything at arm's length because there is nothing on the rear side of the device (the left in Fig. 2) which would injure his clothing or his person if he held the machine close against his body. From time to time the cap 7 can be removed and the font refilled. The removability of the handle 8 through its thumb nuts 13 renders it possible to substitute a shaft 12 of different length, in case the operator is taller or shorter than a man of average height.

The material and exact construction of parts are not essential to the gist of this invention.

What is claimed is:

1. In a sprayer, the combination with an upright font having an outlet opening in its side wall near its bottom, a handle rising from said font, a pump barrel depending from said font, a rod sliding therein, a valve at the upper end of the rod, and a stirrup at its lower end; of a collar projecting from said font and inclosing said outlet opening, a nozzle axially adjustable around said collar and having a jet tube, an air tube extending across said jet tube and having a perforation directed across the outer end thereof, and a flexible connection between the interior of the pump barrel and the said air tube.

2. In a sprayer, the combination with an upright font having an outlet opening in its side wall near its bottom, and an air pump; of a collar surrounding said opening, a nozzle axially adjustable upon said collar and having a jet tube whose axis lies in a plane at right angles to the axis of said nozzle, an air tube having a perforation directed across the outer end of said jet tube, and a flexible connection between said pump and air tube.

3. In a sprayer, the combination with an upright font having an outlet opening in its side wall near its bottom, and an air pump; of a bolt projecting through the wall of said font adjacent its outlet opening, a nozzle whose cylindrical body surrounds said bolt and opening, a nut on the outer end of the bolt beyond the closed outer end of the nozzle, a jet tube within the nozzle and projecting laterally through its wall, an air tube having a perforation directed across the outer end of the jet tube, and a flexible connection between the air tube and the interior of the pump.

4. The herein described insecticide distributer, the same consisting of a font having two outlet openings near its lower end, collars fixed around said openings, nozzles rotatably mounted upon said collars, a series of jet tubes within each nozzle whose axes lie in a plane at right angles to the axis of said nozzle, and whose outer ends extend through the wall of the nozzle, air tubes secured along the outer walls of the nozzles in proximity to said jets and having fine perforations directed across the outer ends of the jet tubes, and means for directing a blast of air into said air tubes.

In testimony that I claim the foregoing as my own, I have hereto affixed my signature in the presence of two witnesses.

JOHN FRANKLIN PATTERSON.

Witnesses:
HOMER E. STEWART,
J. A. STOUGH.

Copies of this patent may be obtained for five cents each, by addressing the "Commissioner of Patents, Washington, D. C."